(12) United States Patent
Yang et al.

(10) Patent No.: US 8,723,364 B2
(45) Date of Patent: May 13, 2014

(54) UNINTERRUPTIBLE POWER SUPPLY HAVING INTEGRATED CHARGE/DISCHARGE CIRCUIT

(75) Inventors: Ping-Long Yang, Taoyuan Hsien (TW); Chia-Hsiang Li, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 636 days.

(21) Appl. No.: 12/977,052

(22) Filed: Dec. 22, 2010

(65) Prior Publication Data

US 2011/0156482 A1 Jun. 30, 2011

(30) Foreign Application Priority Data

Dec. 29, 2009 (TW) ................................. 98145640 A

(51) Int. Cl.
*H02J 9/00* (2006.01)
(52) U.S. Cl.
USPC .................. 307/66; 307/64; 307/65; 363/110
(58) Field of Classification Search
CPC .............. H02J 9/00; H02J 9/061; H02J 9/062
USPC ....................................... 307/64–66; 363/110
See application file for complete search history.

(56) References Cited

U.S. PATENT DOCUMENTS

| 2004/0201931 A1* | 10/2004 | Korcharz et al. ............... 361/18 |
| 2005/0024905 A1* | 2/2005 | Shiojima ...................... 363/110 |
| 2008/0157596 A1* | 7/2008 | Yeh .............................. 307/23 |
| 2008/0265681 A1* | 10/2008 | Pfitzer et al. .................. 307/65 |

FOREIGN PATENT DOCUMENTS

| TW | 200743288 | 11/2007 |
| TW | 200847120 | 12/2008 |

OTHER PUBLICATIONS

Texas Instruments, BiCMOS Advanced Phase-Shift PWM Controller, Dec. 1999 revied Apr. 2006, UCC1895, UCC2895, UCC3895, pp. 1-18, http://www.jameco.com/Jameco/Products/ProdDS/764721.pdf.*

* cited by examiner

*Primary Examiner* — Jared Fureman
*Assistant Examiner* — Alfonso Perez Borroto

(57) ABSTRACT

An uninterruptible power supply includes an AC-to-DC converting circuit, an energy storage unit, a first path-switching circuit, a second path-switching circuit, an integrated charge/discharge circuit and an operating control unit. If the input voltage is abnormal, the input terminal and the output terminal of the integrated charge/discharge circuit are respectively connected to the energy storage unit and the power supply output terminal, so that electric energy stored in the energy storage unit is transmitted to the power supply output terminal through the integrated charge/discharge circuit. Whereas, if the input voltage is normal, the input terminal and the output terminal of the integrated charge/discharge circuit are respectively connected to the power supply output terminal and the energy storage unit, so that the energy storage unit is charged by the integrated charge/discharge circuit.

20 Claims, 2 Drawing Sheets

UNINTERRUPTIBLE POWER SUPPLY HAVING INTEGRATED CHARGE/DISCHARGE CIRCUIT

CLAIM OF PRIORITY

This application claims priority to Taiwanese Patent Application No. 098145640 filed on Dec. 29, 2009.

FIELD OF THE INVENTION

The present invention relates to an uninterruptible power supply (UPS), and more particularly to an uninterruptible power supply (UPS) with an integrated charge/discharge circuit.

BACKGROUND OF THE INVENTION

With increasing development of information industries and high-tech industries, most precise electronic instruments and facilities need highly reliable power to maintain normal operations. Generally, an uninterruptible power supply (UPS) are widely used to provide stable power to the loads that are connected with the UPS. For example, UPS apparatuses become essential for network communication appliances, data centers and some important information appliances.

The conventional uninterruptible power supply (UPS) comprises a charge circuit and a DC-to-DC converting circuit for providing standby power. In a case that the utility power source is normal, the DC-to-DC converting circuit is disabled but the backup battery of the uninterruptible power supply is charged by the charge circuit. Whereas, in a case that the utility power source is interrupted, the charge circuit is disabled but the storage voltage of the backup battery (e.g. 11V) is converted into the rated voltage of the load (e.g. 12V).

Since the charge circuit and the DC-to-DC converting circuit of the conventional uninterruptible power supply are two independent circuits for charging and discharging the backup battery, the volume of the conventional uninterruptible power supply is bulky. In addition, the conventional uninterruptible power supply has a high component number, complicated circuitry layout and high fabricating cost. Moreover, since the charge circuit and the DC-to-DC converting circuit fail to be simultaneously operated, the circuitry utilization of the conventional uninterruptible power supply is insufficient.

Therefore, there is a need of providing an uninterruptible power supply with an integrated charge/discharge circuit so as to obviate the drawbacks encountered from the prior art.

SUMMARY OF THE INVENTION

It is an object of the present invention to provide an uninterruptible power supply having an integrated charge/discharge circuit for charging the energy storage unit when the input voltage is normal or discharging the energy storage unit when the input voltage is abnormal.

Another object of the present invention provides an uninterruptible power supply having reduced volume, less component number and simplified circuitry layout.

A further object of the present invention provides an uninterruptible power supply having enhanced operating efficiency during the charging process and having extended use time of the energy storage unit during the discharging process.

In accordance with an aspect of the present invention, there is provided an uninterruptible power supply for receiving an input voltage and outputting an uninterruptible DC output voltage. The uninterruptible power supply includes an AC-to-DC converting circuit, an energy storage unit, a first path-switching circuit, a second path-switching circuit, an integrated charge/discharge circuit and an operating control unit. The AC-to-DC converting circuit is connected to a power supply output terminal and a common terminal for receiving the input voltage. The energy storage unit is for storing electric energy. The first path-switching circuit is connected to the power supply output terminal and the energy storage unit. The second path-switching circuit is connected to the energy storage unit and the power supply output terminal. The integrated charge/discharge circuit has an input terminal and an output terminal respectively connected to the first path-switching circuit and the second path-switching circuit, thereby controlling a charging process or a discharging process of the energy storage unit. If the input voltage is abnormal, the first path-switching circuit and the second path-switching circuit are controlled by the operating control unit to allow the input terminal and the output terminal of the integrated charge/discharge circuit to be respectively connected to the energy storage unit and the power supply output terminal, so that electric energy stored in the energy storage unit is transmitted to the power supply output terminal through the integrated charge/discharge circuit. Whereas, if the input voltage is normal, the first path-switching circuit and the second path-switching circuit are controlled by the operating control unit to allow the input terminal and the output terminal of the integrated charge/discharge circuit to be respectively connected to the power supply output terminal and the energy storage unit, so that the energy storage unit is charged by the integrated charge/discharge circuit.

In accordance with another aspect of the present invention, there is provided an uninterruptible power supply for receiving a DC input voltage from a DC power source and outputting an uninterruptible DC output voltage to an electronic appliance. The uninterruptible power supply includes an energy storage unit, a first path-switching circuit, a second path-switching circuit, an integrated charge/discharge circuit and an operating control unit. The energy storage unit is connected to a common terminal for storing electric energy. The first path-switching circuit is connected to a power supply terminal of the DC power source and the energy storage unit. The second path-switching circuit is connected to the energy storage unit and the power supply terminal of the DC power source. The integrated charge/discharge circuit has an input terminal and an output terminal respectively connected to the first path-switching circuit and the second path-switching circuit, thereby controlling a charging process or a discharging process of the energy storage unit. If the DC output voltage is abnormal, the first path-switching circuit and the second path-switching circuit are controlled by the operating control unit to allow the input terminal and the output terminal of the integrated charge/discharge circuit to be respectively connected to the energy storage unit and the power supply terminal of the DC power source, so that electric energy stored in the energy storage unit is transmitted to the power supply terminal of the DC power source through the integrated charge/discharge circuit. Whereas, if the DC output voltage is normal, the first path-switching circuit and the second path-switching circuit are controlled by the operating control unit to allow the input terminal and the output terminal of the integrated charge/discharge circuit to be respectively connected to the power supply terminal of the DC power source and the energy storage unit, so that the energy storage unit is charged by the integrated charge/discharge circuit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
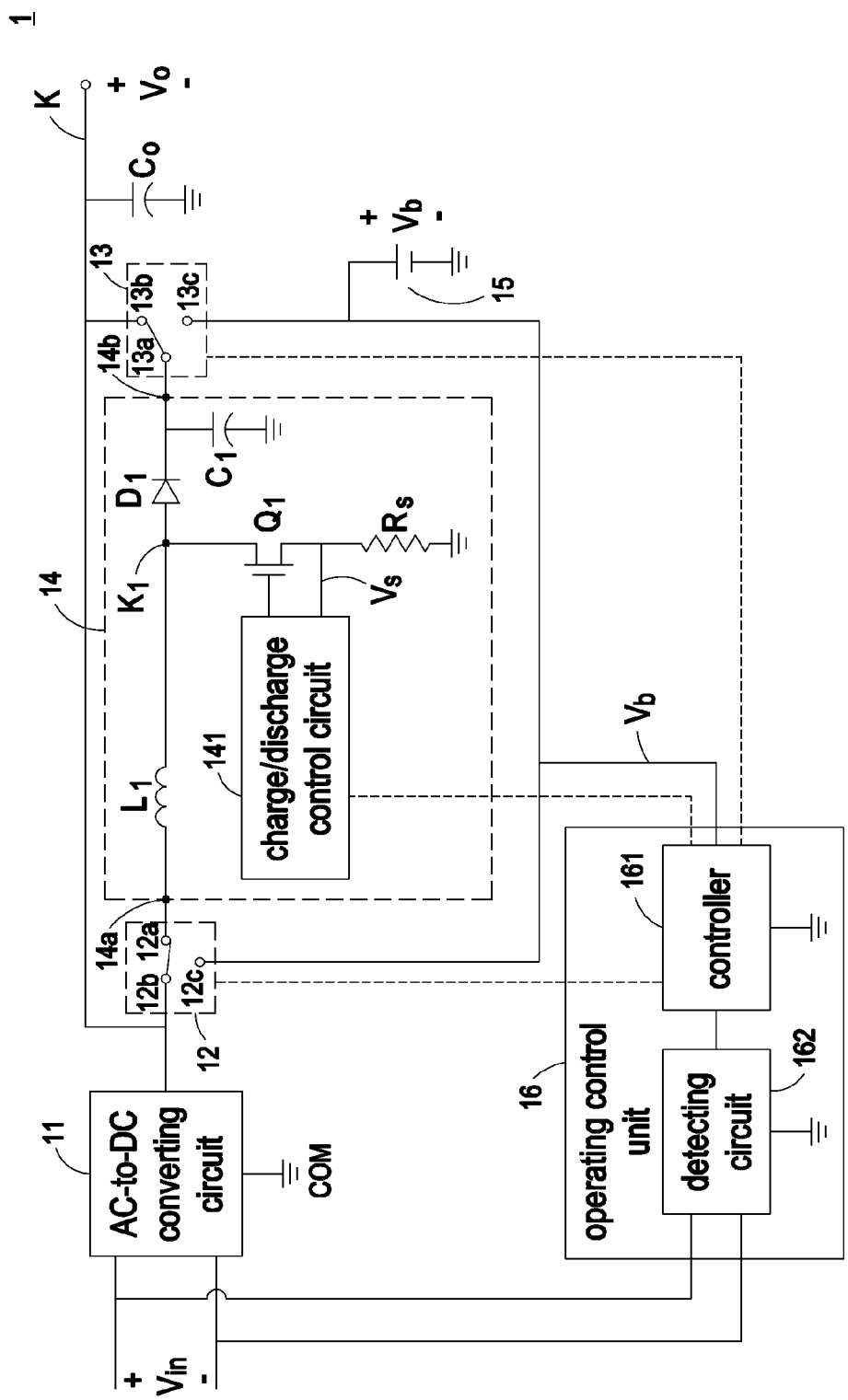
FIG. 1 is a schematic circuit diagram illustrating an uninterruptible power supply with an integrated charge/discharge circuit according to an embodiment of the present invention.

FIG. 1 is a schematic circuit diagram illustrating an uninterruptible power supply with an integrated charge/discharge circuit according to an embodiment of the present invention. As shown in FIG. 1, the uninterruptible power supply 1 receives an AC input voltage $V_{in}$ and outputs an uninterruptible DC output voltage $V_o$ from a power supply output terminal K. The uninterruptible power supply 1 comprises an AC-to-DC converting circuit 11, a first path-switching circuit 12, a second path-switching circuit 13, an integrated charge/discharge circuit 14, an energy storage unit 15, an operating control unit 16 and an output capacitor $C_o$. The AC-to-DC converting circuit 11 is connected to a second contact 12b of the first path-switching circuit 12 and the power supply output terminal K. By the AC-to-DC converting circuit 11, the AC input voltage $V_{in}$ (e.g. 110V) is converted into the DC output voltage $V_o$ (e.g. 12V). The output capacitor $C_o$ is interconnected between the power supply output terminal K and a common terminal COM.

An example of the first path-switching circuit 12 includes but is not limited to a relay, a metal oxide semiconductor field effect transistor (MOSFET) or a bipolar junction transistor (BJT). An example of the second path-switching circuit 13 includes but is not limited to a relay, a metal oxide semiconductor field effect transistor (MOSFET) or a bipolar junction transistor (BJT). The first contact 12a of the first path-switching circuit 12 is connected to the input terminal 14a of the integrated charge/discharge circuit 14. The first contact 13a of the second path-switching circuit 13 is connected to the output terminal 14b of the integrated charge/discharge circuit 14. The second contact 12b of the first path-switching circuit 12 and the second contact 13b of the second path-switching circuit 13 are connected to the power supply output terminal K. The third contact 12c of the first path-switching circuit 12 and the third contact 13c of the second path-switching circuit 13 are connected to the energy storage unit 15.

The integrated charge/discharge circuit 14 is used for charging the energy storage unit 15. In addition, the electric energy stored in the energy storage unit 15 may be transmitted to the power supply output terminal K through the integrated charge/discharge circuit 14. In this embodiment, the integrated charge/discharge circuit 14 comprises a charge/discharge control circuit 141, a first inductor $L_1$, a first diode $D_1$, a first switch element $Q_1$, a first capacitor $C_1$ and a detecting resistor $R_s$. The first inductor $L_1$ is interconnected between the input terminal 14a of the integrated charge/discharge circuit 14 and a first connecting node $K_1$. The first diode $D_1$ is interconnected between the first connecting node $K_1$ and the output terminal 14b of the integrated charge/discharge circuit 14. The first capacitor $C_1$ is interconnected between the output terminal 14b of the integrated charge/discharge circuit 14 and the common terminal COM. The first switch element $Q_1$ and the detecting resistor $R_s$ are serially connected between the first connecting node $K_1$ and the common terminal COM. The charge/discharge control circuit 141 is connected to an end of the detecting resistor $R_s$, the control terminal of the first switch element $Q_1$ and the controller 161 of the operating control unit 16. The charge/discharge control circuit 141 is used for controlling the on/off statuses of the first switch element $Q_1$. In a case that the first switch element $Q_1$ is conducted (in the on status), the current flowing through the detecting resistor $R_s$ will correspondingly generate a detecting voltage $V_s$. According to the detecting voltage $V_s$, the duty cycle of conducting the first switch element $Q_1$ is adjusted by the charge/discharge control circuit 141. An example of the first switch element $Q_1$ includes but is not limited to a metal oxide semiconductor field effect transistor (MOSFET) or a bipolar junction transistor (BJT).

The operating control unit 16 comprises a detecting circuit 162 and a controller 161. The detecting circuit 162 is connected to the input terminal of the AC-to-DC converting circuit 11 and the controller 161. The detecting circuit 162 is used for detecting the operating status of the AC input voltage $V_{in}$ (e.g. a utility power source). An example of the controller 161 includes but is not limited to a micro controller unit (MCU) or a digital signal processor (DSP). The controller 161 is connected to the detecting circuit 162, the control terminal of the first path-switching circuit 12, the control terminal of the second path-switching circuit 13, the charge/discharge control circuit 141 and the energy storage unit 15. The controller 161 is used for controlling operations of the uninterruptible power supply 1.

In a case that the AC input voltage $V_{in}$ is suffered from a sudden variation because of interruption, too low voltage, too high voltage, too low frequency or too high frequency, the AC-to-DC converting circuit 11 fails to output the DC output voltage $V_o$ with the rated voltage value. Under control of the controller 161, a conducting path is defined between the first contact 12a and the third contact 12c of the first path-switching circuit 12, and another conducting path is defined between the first contact 13a and the second contact 13b of the second path-switching circuit 13. As such, the input terminal 14a and the output terminal 14b of the integrated charge/discharge circuit 14 are respectively connected to the energy storage unit 15 and the power supply output terminal K. Under this circumstance, the electric energy stored in the energy storage unit 15 will be transmitted to the power supply output terminal K through the integrated charge/discharge circuit 14.

That is, in a case that the AC input voltage $V_{in}$ is abnormal, the electric energy stored in the energy storage unit 15 will be transmitted to the power supply output terminal K through the integrated charge/discharge circuit 14 under control of the controller 161. Moreover, the operations of the integrated charge/discharge circuit 14 are controlled by the controller 161 according to a storage voltage $V_b$ of the energy storage unit 15.

Hereinafter, the discharging process will be illustrated in more details. When the storage voltage $V_b$ of the energy storage unit 15 is greater than the rated voltage value $V_k$ of the DC output voltage $V_o$ (i.e. $V_b > V_k$), the integrated charge/ discharge circuit 14 is operated in a pass-through mode under control of the controller 161. In the pass-through mode, the first switch element $Q_1$ is shut off. The storage voltage $V_b$ of the energy storage unit 15 is not increased by the integrated charge/discharge circuit 14. On the other hand, the storage voltage $V_b$ of the energy storage unit 15 is successively transmitted through the third contact 12c of the first path-switching circuit 12, the first contact 12a of the first path-switching circuit 12, the input terminal 14a of the integrated charge/discharge circuit 14, the first inductor $L_1$, the first diode $D_1$, the output terminal 14b of the integrated charge/discharge circuit 14, the first contact 13a of the second path-switching circuit 13 and the second contact 13b of the second path-switching circuit 13 to the power supply output terminal K. In other words, the electric energy stored in the energy storage unit 15 is transmitted to the power supply output terminal K through the integrated charge/discharge circuit 14. Meanwhile, the magnitude of the DC output voltage $V_o$ is substantially equal to the storage voltage $V_b$ of the energy storage unit 15 (i.e. $V_o=V_b$). In practice, the magnitude of the DC output voltage $V_o$ is equal to the difference between the storage voltage $V_b$ and the forward voltage (0.7V) of the first diode $D_1$ (i.e. $V_o=V_b-0.7$).

The discharging process is continuously performed. When the storage voltage $V_b$ of the energy storage unit 15 is smaller than or equal to a first threshold value $V_{t1}$ ($V_b \le V_{t1}$), the integrated charge/discharge circuit 14 is operated in a pulse width modulation (PWM) mode under control of the controller 161. That is, the first switch element $Q_1$ is conducted or shut off in the PWM mode under control of the charge/discharge control circuit 141. The storage voltage $V_b$ of the energy storage unit 15 is increased by the integrated charge/discharge circuit 14 and then transmitted to the power supply output terminal K. Meanwhile, the magnitude of the DC output voltage $V_o$ is greater than the storage voltage $V_b$ of the energy storage unit 15 (i.e. $V_o>V_b$).

For example, if the AC input voltage $V_{in}$ is abnormal and the storage voltage $V_b$ of the energy storage unit 15 and the rated voltage value $V_k$ of the DC output voltage $V_o$ are respectively 13V and 12V (i.e. $V_b>V_k$), the integrated charge/discharge circuit 14 is operated in the pass-through mode under control of the controller 161. In the pass-through mode, the first switch element $Q_1$ is shut off. The storage voltage $V_b$ of the energy storage unit 15 is not increased by the integrated charge/discharge circuit 14. On the other hand, the storage voltage $V_b$ of the energy storage unit 15 is successively transmitted to the power supply output terminal K through the integrated charge/discharge circuit 14. In other words, the electric energy stored in the energy storage unit 15 is transmitted from the energy storage unit 15 to the power supply output terminal K through the integrated charge/discharge circuit 14. Meanwhile, the magnitude of the DC output voltage $V_o$ is equal to 13V (i.e. $V_o=V_b$). In practice, the magnitude of the DC output voltage $V_o$ is equal to 12.3V (i.e. $V_o=V_b-0.7$). The discharging process is continuously performed. When the storage voltage $V_b$ of the energy storage unit 15 is smaller than or equal to the first threshold value $V_{t1}$ of 12V (i.e. $V_b \le V_{t1}$), the integrated charge/discharge circuit 14 is operated in a pulse width modulation (PWM) mode under control of the controller 161. That is, the first switch element $Q_1$ is conducted or shut off in the PWM mode under control of the charge/discharge control circuit 141. The storage voltage $V_b$ of the energy storage unit 15 is increased by the integrated charge/discharge circuit 14 and then transmitted to the power supply output terminal K. Meanwhile, the magnitude of the DC output voltage $V_o$ is 12V (i.e. $V_o>(V_b-0.7)$).

In a case that the AC input voltage $V_{in}$ is normal, the AC-to-DC converting circuit 11 outputs the DC output voltage $V_o$ having the rated voltage value. Under control of the controller 161, a conducting path is defined between the first contact 12a and the second contact 12b of the first path-switching circuit 12, and another conducting path is defined between the first contact 13a and the third contact 13c of the second path-switching circuit 13. As such, the input terminal 14a and the output terminal 14b of the integrated charge/discharge circuit 14 are respectively connected to the power supply output terminal K and the energy storage unit 15.

That is, in a case that the AC input voltage $V_{in}$ is normal, the energy storage unit 15 will be charged by the integrated charge/discharge circuit 14 under control of the controller 161. Moreover, according to the storage voltage $V_b$ of the energy storage unit 15, the controller 161 will determine whether the integrated charge/discharge circuit 14 is operated in the PWM mode to increase the DC output voltage $V_o$ to charge the energy storage unit 15.

Hereinafter, the charging process will be illustrated in more details. When the storage voltage $V_b$ of the energy storage unit 15 is too low and smaller than the DC output voltage $V_o$ (i.e. $V_b<V_o$), the integrated charge/discharge circuit 14 is operated in a pass-through mode under control of the controller 161. In the pass-through mode, the first switch element $Q_1$ is shut off. The DC output voltage $V_o$ is not increased by the integrated charge/discharge circuit 14. On the other hand, the DC output voltage $V_o$ is successively transmitted through the second contact 12b of the first path-switching circuit 12, the first contact 12a of the first path-switching circuit 12, the input terminal 14a of the integrated charge/discharge circuit 14, the first inductor $L_1$, the first diode $D_1$, the output terminal 14b of the integrated charge/discharge circuit 14, the first contact 13a of the second path-switching circuit 13 and the third contact 13c of the second path-switching circuit 13 to energy storage unit 15, thereby charging the energy storage unit 15. As such, the electric energy stored in the energy storage unit 15 is increased. Meanwhile, the storage voltage $V_b$ of the energy storage unit 15 is substantially equal to the magnitude of the DC output voltage $V_o$ (i.e. $V_b=V_o$). In practice, the storage voltage $V_b$ of the energy storage unit 15 is equal to the difference between the DC output voltage $V_o$ and the forward voltage (0.7V) of the first diode $D_1$ (i.e. $V_b=V_o-0.7$).

The charging process is continuously performed. When the storage voltage $V_b$ of the energy storage unit 15 is greater than or equal to a second threshold value $V_{t2}$ ($V_b \ge V_{t2}$), the integrated charge/discharge circuit 14 is operated in a pulse width modulation (PWM) mode under control of the controller 161. That is, the first switch element $Q_1$ is conducted or shut off in the PWM mode under control of the charge/discharge control circuit 141. The magnitude of the DC output voltage $V_o$ is increased by the integrated charge/discharge circuit 14 and then transmitted to the energy storage unit 15 for charging the energy storage unit 15. Meanwhile, the storage voltage $V_b$ of the energy storage unit 15 is greater than the magnitude of the DC output voltage $V_o$ (i.e. $V_b>V_o$).

For example, if the AC input voltage $V_{in}$ is normal and the storage voltage $V_b$ of the energy storage unit 15 and the DC output voltage $V_o$ are respectively 11V and 12V (i.e. $V_b<V_o$), the integrated charge/discharge circuit 14 is operated in the pass-through mode under control of the controller 161. In the pass-through mode, the first switch element $Q_1$ is shut off. The DC output voltage $V_o$ is not increased by the integrated charge/discharge circuit 14. On the other hand, the DC output voltage $V_o$ is successively transmitted to the energy storage unit 15 through the integrated charge/discharge circuit 14, thereby charging the energy storage unit 15. Meanwhile, the storage voltage $V_b$ of the energy storage unit 15 is equal to 12V (i.e. $V_b=V_o$). In practice, the storage voltage $V_b$ of the energy storage unit 15 is equal to 11.3V (i.e. $V_b=V_o-0.7$). The charging process is continuously performed. When the storage voltage $V_b$ of the energy storage unit 15 is greater than or equal to the second threshold value $V_{t2}$ of 12V (i.e. $V_b \geq V_{t2}$), the integrated charge/discharge circuit 14 is operated in a pulse width modulation (PWM) mode under control of the controller 161. That is, the first switch element $Q_1$ is conducted or shut off in the PWM mode under control of the charge/discharge control circuit 141. The magnitude of the DC output voltage $V_o$ is increased by the integrated charge/discharge circuit 14 and then transmitted to the energy storage unit 15 for charging the energy storage unit 15. Meanwhile, the storage voltage $V_b$ of the energy storage unit 15 is 13.7V (i.e. $V_b > V_o$).

Figure 2:
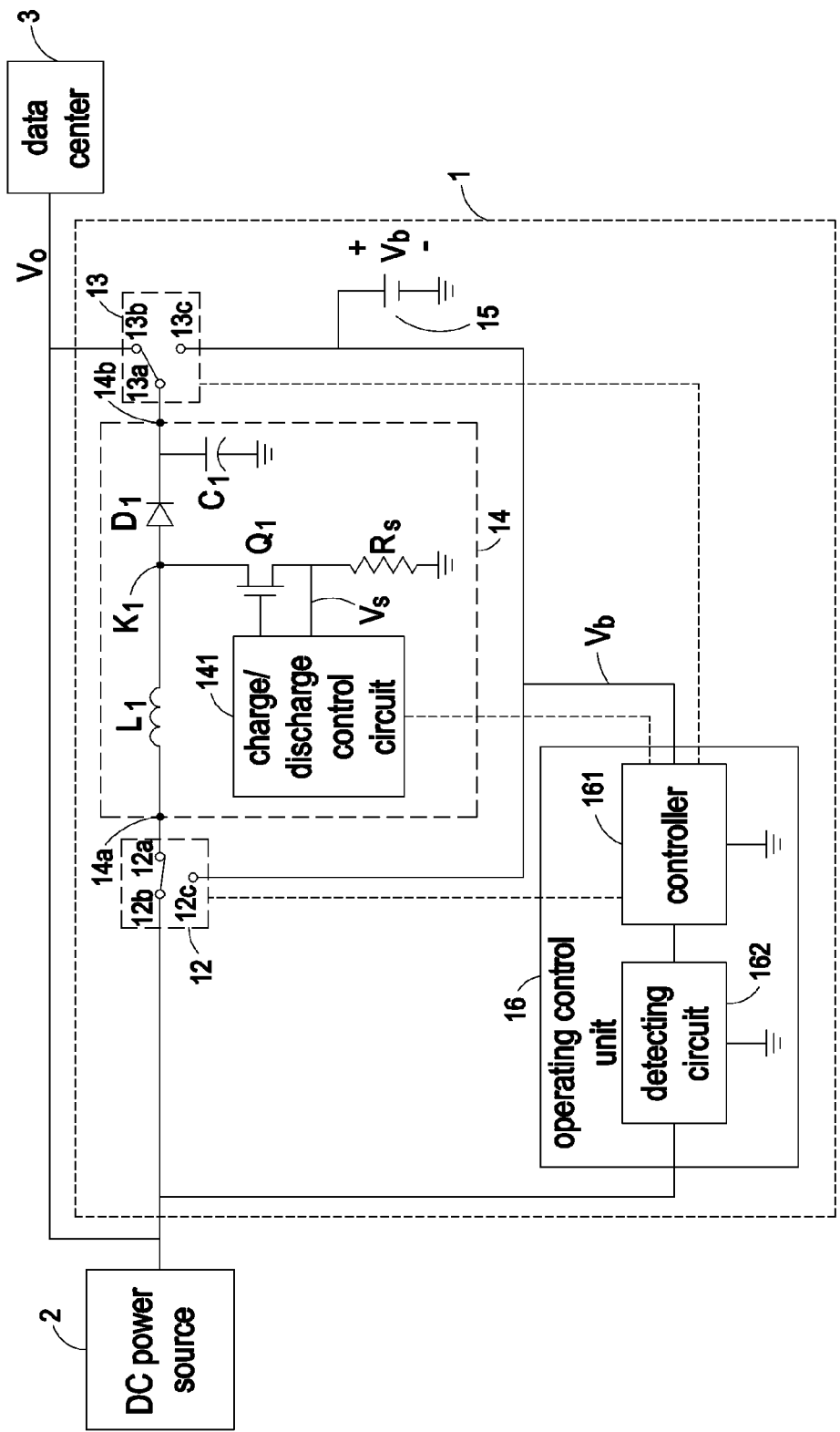
FIG. 2 is a schematic circuit diagram illustrating an uninterruptible power supply with an integrated charge/discharge circuit according to another embodiment of the present invention.

FIG. 2 is a schematic circuit diagram illustrating an uninterruptible power supply with an integrated charge/discharge circuit according to another embodiment of the present invention. In comparison with FIG. 1, the AC-to-DC converting circuit 11 is not included in the uninterruptible power supply 1 of FIG. 2. In addition, the detecting circuit 162 of the operating control unit 16 is connected to a DC power source 2 and the controller 161 for detecting the operating status of the DC output voltage $V_o$, which is provided by the DC power source 2. Moreover, the second contact 12b of the first path-switching circuit 12 and the second contact 13b of the second path-switching circuit 13 are connected to the power supply terminal of the DC power source 2.

In this embodiment, the DC output voltage $V_o$ is directly transmitted from the DC power source 2 to an electronic appliance 3 (e.g. a data center or a communication appliance). The uninterruptible power supply 1 is directly connected to the power supply terminal of the DC power source 2. According to the operating status of the DC output voltage $V_o$, the electric energy stored in the energy storage unit 15 is discharged to the power supply terminal of the DC power source 2, or the energy storage unit 15 is charged by the DC output voltage $V_o$.

In this embodiment, the detecting circuit 162 is used for detecting the operating status of the DC output voltage $V_o$. In a case that the DC output voltage $V_o$ is abnormal, the DC power source 2 fails to output the DC output voltage $V_o$ with the rated voltage value. Under control of the controller 161, a conducting path is defined between the first contact 12a and the third contact 12c of the first path-switching circuit 12, and another conducting path is defined between the first contact 13a and the second contact 13b of the second path-switching circuit 13. As such, the input terminal 14a and the output terminal 14b of the integrated charge/discharge circuit 14 are respectively connected to the energy storage unit 15 and the power supply terminal of the DC power source 2. Under this circumstance, the electric energy stored in the energy storage unit 15 will be discharged to the power supply terminal of the DC power source 2 through the integrated charge/discharge circuit 14.

That is, in a case that the DC output voltage $V_o$ is abnormal, the electric energy stored in the energy storage unit 15 will be transmitted to the power supply terminal of the DC power source 2 through the integrated charge/discharge circuit 14 under control of the controller 161. Moreover, the operations of the integrated charge/discharge circuit 14 are controlled by the controller 161 according to a storage voltage $V_b$ of the energy storage unit 15.

Hereinafter, the discharging process will be illustrated in more details. When the storage voltage $V_b$ of the energy storage unit 15 is greater than the rated voltage value $V_k$ of the DC output voltage $V_o$ (i.e. $V_b > V_k$), the integrated charge/discharge circuit 14 is operated in a pass-through mode under control of the controller 161. In the pass-through mode, the first switch element $Q_1$ is shut off. The storage voltage $V_b$ of the energy storage unit 15 is not increased by the integrated charge/discharge circuit 14. On the other hand, the storage voltage $V_b$ of the energy storage unit 15 is successively transmitted through the third contact 12c of the first path-switching circuit 12, the first contact 12a of the first path-switching circuit 12, the input terminal 14a of the integrated charge/discharge circuit 14, the first inductor $L_1$, the first diode $D_1$, the output terminal 14b of the integrated charge/discharge circuit 14, the first contact 13a of the second path-switching circuit 13 and the second contact 13b of the second path-switching circuit 13 to the power supply terminal of the DC power source 2. In other words, the electric energy stored in the energy storage unit 15 is transmitted to the power supply terminal of the DC power source 2 through the integrated charge/discharge circuit 14. Meanwhile, the magnitude of the DC output voltage $V_o$ is substantially equal to the storage voltage $V_b$ of the energy storage unit 15 (i.e. $V_o=V_b$). In practice, the magnitude of the DC output voltage $V_o$ is equal to the difference between the storage voltage $V_b$ and the forward voltage (0.7V) of the first diode $D_1$ (i.e. $V_o=V_b-0.7$).

The discharging process is continuously performed. When the storage voltage $V_b$ of the energy storage unit 15 is smaller than or equal to a first threshold value $V_{t1}$ ($V_b \leq V_{t1}$), the integrated charge/discharge circuit 14 is operated in a pulse width modulation (PWM) mode under control of the controller 161. That is, the first switch element $Q_1$ is conducted or shut off in the PWM mode under control of the charge/discharge control circuit 141. The storage voltage $V_b$ of the energy storage unit 15 is increased by the integrated charge/discharge circuit 14 and then transmitted to the power supply terminal of the DC power source 2. Meanwhile, the magnitude of the DC output voltage $V_o$ is greater than the storage voltage $V_b$ of the energy storage unit 15 (i.e. $V_o > V_b$).

From the above description, the uninterruptible power supply of the present invention has an integrated charge/discharge circuit for charging the energy storage unit when the input voltage is normal or discharging the energy storage unit when the input voltage is abnormal. Since a single integrated charge/discharge circuit is used, the overall volume of the uninterruptible power supply is reduced, the number of components is reduced and the circuitry layout is simplified. Since the integrated charge/discharge circuit may charging the energy storage unit when the input voltage is normal or discharging the energy storage unit when the input voltage is abnormal, the circuitry utilization of the integrated charge/discharge circuit is enhanced. During the charging process and the discharging process of the integrated charge/discharge circuit, the integrated charge/discharge circuit is operated in a pulse width modulation mode or a pass-through mode under control of the operating control unit according to a storage voltage of the energy storage unit. In addition, since the integrated charge/discharge circuit may be operated in the pass-through mode, the power loss is reduced and the operating efficiency of the uninterruptible power supply is enhanced during the charging process. On the other hand, the use time of the energy storage unit increased during the discharging process. When the DC output voltage is directly transmitted from the DC power source to an electronic appliance (e.g. a data center or a communication appliance), the AC-to-DC converting circuit is omitted and thus the uninterruptible power supply becomes more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply for receiving an input voltage and outputting an uninterruptible DC output voltage, said uninterruptible power supply comprising:
   an AC-to-DC converting circuit connected to a power supply output terminal and a common terminal for receiving said input voltage;
   an energy storage unit for storing electric energy;
   a first path-switching circuit connected to said power supply output terminal and said energy storage unit;
   a second path-switching circuit connected to said energy storage unit and said power supply output terminal;
   an integrated charge/discharge circuit having an input terminal and an output terminal respectively connected to said first path-switching circuit and said second path-switching circuit, thereby controlling a charging process or a discharging process of said energy storage unit; and
   an operating control unit,
   wherein if said input voltage is abnormal, said first path-switching circuit and said second path-switching circuit are controlled by said operating control unit to allow said input terminal and said output terminal of said integrated charge/discharge circuit to be respectively connected to said energy storage unit and said power supply output terminal, so that electric energy stored in said energy storage unit is transmitted to said power supply output terminal through said integrated charge/discharge circuit; and
   wherein if said input voltage is normal, said first path-switching circuit and said second path-switching circuit are controlled by said operating control unit to allow said input terminal and said output terminal of said integrated charge/discharge circuit to be respectively connected to said power supply output terminal and said energy storage unit, so that said energy storage unit is charged by said integrated charge/discharge circuit.

2. The uninterruptible power supply according to claim 1 wherein during said discharging process, said integrated charge/discharge circuit is operated in a pulse width modulation mode or a pass-through mode under control of said operating control unit according to a storage voltage of said energy storage unit.

3. The uninterruptible power supply according to claim 2 wherein during said discharging process, if said storage voltage of said energy storage unit is greater than a rated voltage value of said DC output voltage, said integrated charge/discharge circuit is operated in said pass-through mode under control of said operating control unit, so that said storage voltage of said energy storage unit is transmitted to said power supply output terminal through said integrated charge/discharge circuit.

4. The uninterruptible power supply according to claim 3 wherein during said discharging process, if said storage voltage of said energy storage unit is smaller than or equal to a first threshold value, said integrated charge/discharge circuit is operated in said pulse width modulation mode under control of said operating control unit, so that said storage voltage of said energy storage unit is increased by said integrated charge/discharge circuit and then transmitted to said power supply output terminal.

5. The uninterruptible power supply according to claim 2 wherein during said charging process, according to said storage voltage of said energy storage unit, said operating control unit determines whether said integrated charge/discharge circuit is operated in said pulse width modulation mode to increase the magnitude of said DC output voltage to charge said energy storage unit.

6. The uninterruptible power supply according to claim 5 wherein during said charging process, if said storage voltage of said energy storage unit is smaller than the magnitude of said DC output voltage, said integrated charge/discharge circuit is operated in said pass-through mode under control of said operating control unit, so that said DC output voltage is transmitted to said energy storage unit to charge said energy storage unit through said integrated charge/discharge circuit.

7. The uninterruptible power supply according to claim 6 wherein during said charging process, if said storage voltage of said energy storage unit is greater than or equal to a second threshold value, said integrated charge/discharge circuit is operated in said pulse width modulation mode under control of said operating control unit, so that said DC output voltage is increased by said integrated charge/discharge circuit and then transmitted to said energy storage unit to charge said energy storage unit.

8. The uninterruptible power supply according to claim 1 further comprising an output capacitor, which is interconnected between said power supply output terminal and said common terminal.

9. The uninterruptible power supply according to claim 1 wherein each of said first path-switching circuit and said second path-switching circuit is a relay, a bipolar junction transistor or a metal oxide semiconductor field effect transistor.

10. The uninterruptible power supply according to claim 1 wherein said operating control unit comprises:
    a detecting circuit connected to an input terminal of said AC-to-DC converting circuit for detecting an operating status of said input voltage; and
    a controller connected to said detecting circuit, a control terminal of said first path-switching circuit, a control terminal of said second path-switching circuit, said integrated charge/discharge circuit and said energy storage unit for controlling operations of said uninterruptible power supply.

11. The uninterruptible power supply according to claim 1 wherein said controller is a micro controller unit or a digital signal processor.

12. The uninterruptible power supply according to claim 1 wherein said integrated charge/discharge circuit comprises:
    a first inductor interconnected between said input terminal of said integrated charge/discharge circuit and a first connecting node;
    a first diode interconnected between said first connecting node and said output terminal of said integrated charge/discharge circuit;
    a first capacitor interconnected between said output terminal of said integrated charge/discharge circuit and said common terminal;
    a detecting resistor;
    a first switch element, wherein said first switch element and said detecting resistor are serially connected between said first connecting node and said common terminal; and a charge/discharge control circuit connected to an end of said detecting resistor, a control terminal of said first switch element and said operating control unit for controlling on/off statuses of said first switch element, wherein when said first switch element is conducted, a current flowing through said detecting resistor correspondingly generates a detecting voltage.

13. The uninterruptible power supply according to claim 12 wherein a duty cycle of said first switch element is adjusted by said charge/discharge control circuit according to said detecting voltage.

14. An uninterruptible power supply for receiving a DC input voltage from a DC power source and outputting an uninterruptible DC output voltage to an electronic appliance, said uninterruptible power supply comprising:
an energy storage unit connected to a common terminal for storing electric energy;
a first path-switching circuit connected to a power supply terminal of said DC power source and said energy storage unit;
a second path-switching circuit connected to said energy storage unit and said power supply terminal of said DC power source;
an integrated charge/discharge circuit having an input terminal and an output terminal respectively connected to said first path-switching circuit and said second path-switching circuit, thereby controlling a charging process or a discharging process of said energy storage unit; and
an operating control unit,
wherein if said DC output voltage is abnormal, said first path-switching circuit and said second path-switching circuit are controlled by said operating control unit to allow said input terminal and said output terminal of said integrated charge/discharge circuit to be respectively connected to said energy storage unit and said power supply terminal of said DC power source, so that electric energy stored in said energy storage unit is transmitted to said power supply terminal of said DC power source through said integrated charge/discharge circuit; and
wherein if said DC output voltage is normal, said first path-switching circuit and said second path-switching circuit are controlled by said operating control unit to allow said input terminal and said output terminal of said integrated charge/discharge circuit to be respectively connected to said power supply terminal of said DC power source and said energy storage unit, so that said energy storage unit is charged by said integrated charge/discharge circuit.

15. The uninterruptible power supply according to claim 14 wherein during said discharging process, said integrated charge/discharge circuit is operated in a pulse width modulation mode or a pass-through mode under control of said operating control unit according to a storage voltage of said energy storage unit.

16. The uninterruptible power supply according to claim 15 wherein during said discharging process, if said storage voltage of said energy storage unit is greater than a rated voltage value of said DC output voltage, said integrated charge/discharge circuit is operated in said pass-through mode under control of said operating control unit, so that said storage voltage of said energy storage unit is transmitted to said power supply terminal of said DC power source terminal through said integrated charge/discharge circuit.

17. The uninterruptible power supply according to claim 16 wherein during said discharging process, if said storage voltage of said energy storage unit is smaller than or equal to a first threshold value, said integrated charge/discharge circuit is operated in said pulse width modulation mode under control of said operating control unit, so that said storage voltage of said energy storage unit is increased by said integrated charge/discharge circuit and then transmitted to said power supply terminal of said DC power source terminal.

18. The uninterruptible power supply according to claim 15 wherein during said charging process, according to said storage voltage of said energy storage unit, said operating control unit determines whether said integrated charge/discharge circuit is operated in said pulse width modulation mode to increase the magnitude of said DC output voltage to charge said energy storage unit.

19. The uninterruptible power supply according to claim 18 wherein during said charging process, if said storage voltage of said energy storage unit is smaller than the magnitude of said DC output voltage, said integrated charge/discharge circuit is operated in said pass-through mode under control of said operating control unit, so that said DC output voltage is transmitted to said energy storage unit to charge said energy storage unit through said integrated charge/discharge circuit.

20. The uninterruptible power supply according to claim 19 wherein during said charging process, if said storage voltage of said energy storage unit is greater than or equal to a second threshold value, said integrated charge/discharge circuit is operated in said pulse width modulation mode under control of said operating control unit, so that said DC output voltage is increased by said integrated charge/discharge circuit and then transmitted to said energy storage unit to charge said energy storage unit.

* * * * *